(12) United States Patent
Ramsdell

(10) Patent No.: US 10,428,565 B1
(45) Date of Patent: Oct. 1, 2019

(54) HINGE AND APPLICATIONS THEREOF

(71) Applicant: Wayne W. Ramsdell, South Sioux City, NE (US)

(72) Inventor: Wayne W. Ramsdell, South Sioux City, NE (US)

( * ) Notice: Subject to any disclaimer, the term of this patent is extended or adjusted under 35 U.S.C. 154(b) by 0 days.

(21) Appl. No.: 15/811,947

(22) Filed: Nov. 14, 2017

Related U.S. Application Data

(63) Continuation-in-part of application No. 15/197,958, filed on Jun. 30, 2016, now Pat. No. 9,828,795, which
(Continued)

(51) Int. Cl.
*E05D 11/08* (2006.01)
*E05F 3/02* (2006.01)
*E05D 3/02* (2006.01)

(52) U.S. Cl.
CPC .............. *E05D 3/02* (2013.01); *E05D 11/082* (2013.01)

(58) Field of Classification Search
CPC ......... Y10T 16/54033; Y10T 16/54034; Y10T 16/540345; Y10T 16/54038; Y10T 16/54048; Y10T 16/5409; Y10T 16/542; Y10T 16/61; Y10T 16/6295; Y10T 16/62; E05D 11/08; E05D 11/081; E05D 11/082; E05D 11/084; E05D 11/085; E05D 11/087; E05D 11/105; E05D 5/121; E05D 5/122;
(Continued)

(56) References Cited

U.S. PATENT DOCUMENTS

| 509,047 | A | * | 11/1893 | Pottle | ............... E05D 11/082 16/338 |
| 516,546 | A | * | 3/1894 | McCauley | ............ E05D 11/082 16/338 |

(Continued)

FOREIGN PATENT DOCUMENTS

| DE | 3002193 | 7/1981 |
| DE | 19838820 | 3/2000 |

(Continued)

OTHER PUBLICATIONS

"Brake Lining Material: M9010-1", Product Data Sheet, Raybestos Products, Raymark Friction Company, Manheim, Pennsylvania, date unknown.

*Primary Examiner* — Chuck Y Mah
(74) *Attorney, Agent, or Firm* — Jeffrey A. Proehl; Woods, Fuller, Shultz & Smith, PC

(57) ABSTRACT

A hinge structure may comprise a first assembly including a central post with an outer surface and a first connector element on the central post for mounting on a first structure, a second assembly pivotally coupled to the first assembly and including a ring extending about the central post, a ring connector connected to the ring, and a second connector element on the ring for mounting on a second structure. A braking element may apply a selectable amount of resistance to pivot movement of the second connector element with respect to the first connector element and including a friction pad extending about a portion of the central post, a pressure band for pressing the friction pad against the central post, and a connecting structure connecting the ends of the band and being adjustable to move the ends closer toward each other and to relax the ends away from each other.

8 Claims, 11 Drawing Sheets

Related U.S. Application Data is a continuation-in-part of application No. 14/697,710, filed on Apr. 28, 2015, now Pat. No. 9,404,300.

(58) Field of Classification Search
CPC .............. E05D 7/0018; E05D 11/1007; E05Y 2201/21; E05Y 2201/49; E05Y 2201/416; E05Y 2201/25; E05Y 2201/252; E05Y 2201/26; G02C 2200/20; G06F 1/1681; E05C 17/30; E05C 17/025; E05C 17/12; E05C 17/04; E05C 17/045; E05C 17/40
See application file for complete search history.

(56) References Cited

U.S. PATENT DOCUMENTS

| | | | |
|---|---|---|---|
| 942,656 A | 12/1909 | Moore | |
| 1,422,163 A | 7/1922 | Zimbelmann | |
| 1,535,668 A | 4/1925 | Jostedt | |
| 1,541,397 A | 6/1925 | Rubin | |
| 1,546,026 A | 7/1925 | Rubin | |
| 1,916,882 A | 7/1933 | Greene | |
| 3,278,979 A | 10/1966 | Clement | |
| 3,357,041 A * | 12/1967 | Brueder | B60J 1/14 16/338 |
| 3,501,993 A * | 3/1970 | Swenson | F16B 35/005 411/393 |
| 4,478,532 A | 10/1984 | Puro | |
| 4,760,621 A | 8/1988 | Stromquist | |
| 4,824,082 A | 4/1989 | Schaupp | |
| 4,865,169 A | 9/1989 | Rachels | |
| 4,951,349 A | 8/1990 | Dietrich | |
| 5,024,303 A | 6/1991 | Kosloff | |
| 5,146,808 A | 9/1992 | Hoshino | |
| 5,331,718 A | 7/1994 | Gilbert | |
| 5,572,769 A | 11/1996 | Spechts | |
| 5,575,513 A | 11/1996 | Tuttle | |
| 5,653,001 A | 8/1997 | Lane | |
| 5,659,925 A | 8/1997 | Patterson | |
| 5,682,645 A | 11/1997 | Watabe | |
| 5,758,937 A | 6/1998 | Lammens | |
| 5,937,482 A | 8/1999 | Horng | |
| 5,966,778 A * | 10/1999 | Ray | E05D 11/082 16/262 |
| 5,967,587 A | 10/1999 | Collet | |
| 6,149,212 A | 11/2000 | Kuntz | |
| 6,931,693 B2 | 8/2005 | Uemura | |
| 7,805,811 B2 * | 10/2010 | Shuker | E05D 5/128 16/380 |
| 7,887,031 B2 | 2/2011 | Murota | |
| 7,987,555 B2 | 8/2011 | Chen | |
| 8,091,179 B2 * | 1/2012 | Wang | G06F 1/1616 16/338 |
| 8,474,796 B2 | 7/2013 | Spence | |
| 2001/0016969 A1 | 8/2001 | Fujita | |
| 2003/0140456 A1 | 7/2003 | Hsieh | |
| 2004/0134033 A1 | 7/2004 | Raines | |
| 2005/0108854 A1 | 5/2005 | Lee | |
| 2006/0000057 A1 | 1/2006 | Rossio | |
| 2010/0064477 A1 | 3/2010 | Wang | |
| 2010/0139040 A1 | 6/2010 | Shen | |
| 2011/0047748 A1 | 3/2011 | Chien | |
| 2011/0099761 A1 | 5/2011 | Wang | |
| 2012/0096679 A1 | 4/2012 | Weber | |
| 2014/0223692 A1 | 8/2014 | Adoline | |
| 2016/0010375 A1 | 1/2016 | Rittenhouse | |

FOREIGN PATENT DOCUMENTS

| | | | | |
|---|---|---|---|---|
| DE | 20307035 U1 * | 10/2003 | ........... | E05D 11/082 |
| JP | 2013002593 | 1/2013 | | |

* cited by examiner

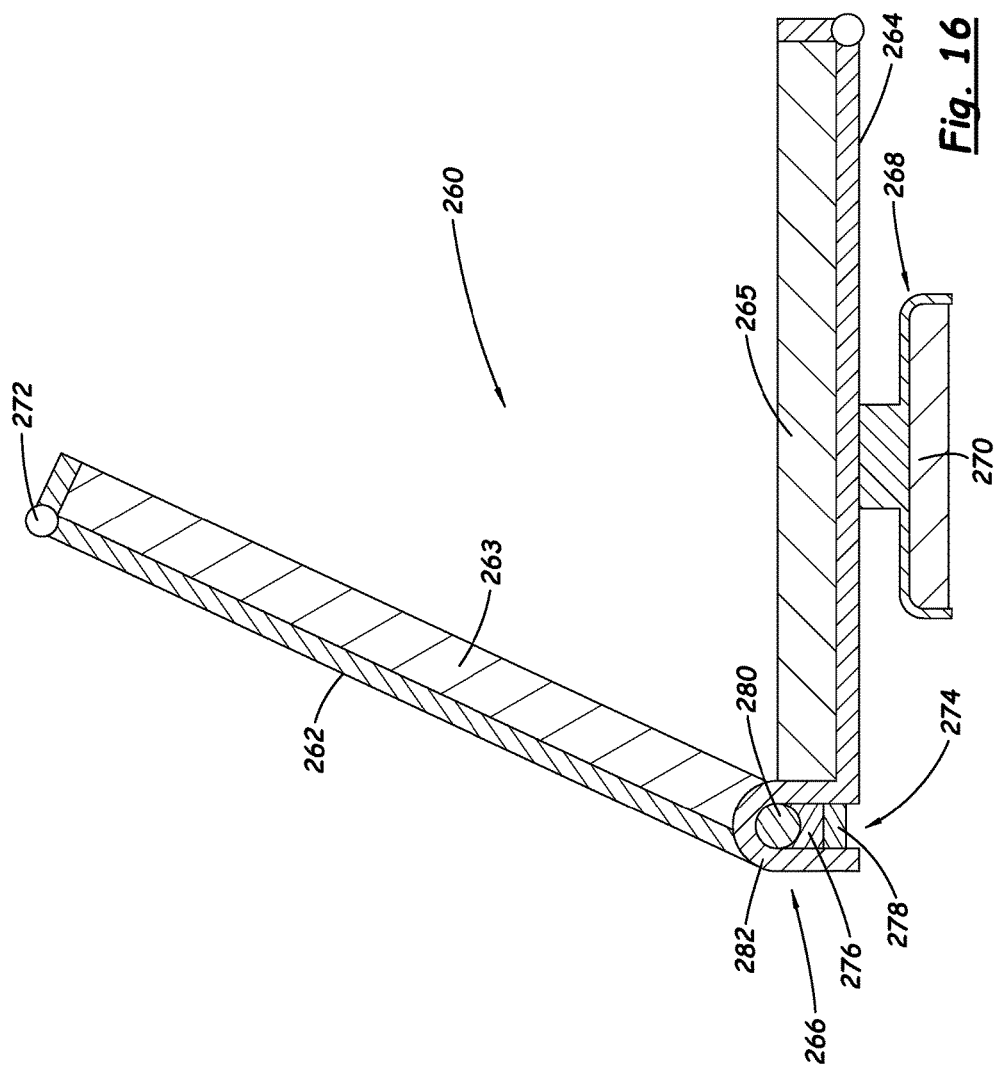

HINGE AND APPLICATIONS THEREOF

REFERENCE TO RELATED APPLICATION

This application is a continuation-in-part of U.S. patent application Ser. No. 5/197,958, filed Jun. 30, 2016, which is a continuation-in-part of U.S. patent application Ser. No. 14/697,710, filed Apr. 28, 2015, each of which are hereby incorporated by reference in their entireties.

BACKGROUND

Field

The present disclosure relates to hinges and more particularly pertains to a new hinge for providing an adjustable degree of resistance to pivot movement between two structures.

SUMMARY

In one aspect, the present disclosure relates to a hinge structure for connecting a first structure to a second in a pivotal manner. The hinge structure may comprise a first assembly for mounting on a first structure, with the first assembly including a central post with an outer surface and a first connector element mounted on the central post. The first connector element may be configured to mount on the first structure. The hinge structure may also include a second assembly for mounting on a second structure, with the second assembly being pivotally coupled to the first assembly. The second assembly may include at least one ring extending about the central post, a ring connector connected to the at least one ring, and a second connector element mounted on the at least one ring. The second connector element may be configured to mount on the second structure. The hinge structure may further include a braking element configured to apply a selectable amount of resistance to pivot movement of the second connector element with respect to the first connector element. The braking element may be positioned between the first assembly and the second assembly. The braking element may comprise a friction pad extending about a portion of the central post in contact with the outer surface of the post, and a pressure band for pressing the friction pad against the central post, the pressure band extending about the central shaft of the first assembly and the ring connector of the second assembly, with the pressure band being elongated with opposite ends. The braking element may also include a connecting structure connecting the ends of the pressure band and being adjustable to move the ends of the pressure band closer toward each other and being adjustable to relax the ends away from each other.

In another aspect, the disclosure relates to a system that may comprise a first structure, a second structure, and a hinge structure connecting the first structure to the second structure in a pivotal manner. The hinge structure may comprise a first assembly for mounting on a first structure, with the first assembly including a central post with an outer surface and a first connector element mounted on the central post. The first connector element may be mounted on the first structure. The hinge structure may also include a second assembly for mounting on a second structure, with the second assembly being pivotally coupled to the first assembly. The second assembly may include at least one ring extending about the central post, a ring connector connected to the at least one ring, and a second connector element mounted on the at least one ring. The second connector element may be mounted on the second structure. The hinge structure may further include a braking element configured to apply a selectable amount of resistance to pivot movement of the second connector element with respect to the first connector element. The braking element may be positioned between the first assembly and the second assembly. The braking element may comprise a friction pad extending about a portion of the central post in contact with the outer surface of the post, and a pressure band for pressing the friction pad against the central post, the pressure band extending about the central shaft of the first assembly and the ring connector of the second assembly, with the pressure band being elongated with opposite ends. The braking element may also include a connecting structure connecting the ends of the pressure band and being adjustable to move the ends of the pressure band closer toward each other and being adjustable to relax the ends away from each other.

In still another aspect, the disclosure is directed to a hinge structure for connecting a first structure to a second in a pivotal manner. The hinge structure may comprise a first assembly for mounting on the first structure, with the first assembly having a first compression surface and a first connector element associated with the first compression surface. The first connector element may be configured to mount on the first structure, and a first pivot aperture may extend through the first compression surface. The hinge structure may also include a second assembly for mounting on the second structure, with the second assembly having a second compression surface positioned in opposition to the first compression surface of the first assembly and a second connector element associated with the second compression surface. The second connector element may be configured to mount on the second structure, and a second pivot aperture may extend through the second compression surface. The hinge structure may also comprise a braking element configured to apply a selectable amount of resistance to pivot movement of the second connector element with respect to the first connector element. The braking element may be positioned between the first assembly and the second assembly. The braking element may comprise a friction pad positioned between the first compression surface and the second compression surface, and the friction pad may be mounted to move with one surface of the first compression surface and the second compression surface. The hinge structure may also include a connector fastener pivotally connecting the second assembly to the first assembly. The connector fastener may extend through the first and second pivot apertures such that tightening of the connector fastener tends to move the first and second compression surfaces toward each other to compress the friction pad and increase resistance to pivot movement of the assemblies with respect to each other, and such that loosening of the connector fastener tends to permit movement of the first and second compression surfaces away from each other to decompress the friction pad and decrease resistance to pivot movement of the assemblies with respect to each other.

In yet another aspect, the disclosure relates to a hinge structure for connecting a first structure to a second in a pivotal manner. The hinge structure may comprise a first assembly configured for mounting on a first structure and a second assembly configured for mounting on a second structure pivotally mounted on the first structure. One of the first and second assemblies may form a bayonet section and an other one of the first and second assemblies may form a sheath section, with at least a portion of the bayonet section being slidably inserted into the sheath section, the bayonet section having an outer surface. The structure may also include a braking element which is configured to apply a selectable amount of resistance to sliding movement of the bayonet section with respect to the sheath section. The braking element may be mounted on the sheath section to act on the bayonet section. The braking element may comprise at least one friction pad positioned adjacent to and in contact with the outer surface of the bayonet section, and a pressure band for pressing the at least one friction pad against the outer surface of the bayonet section. The pressure band may be mounted on the sheath section and extending about the bayonet section, and the pressure band being elongated with opposite ends. The braking element may also include a connecting structure connecting the ends of the pressure band and being adjustable to move the ends of the pressure band closer toward each other to increase pressure on the at least one friction pad against the bayonet and being adjustable to relax the ends away from each other to decrease pressure on the at least one friction pad against the bayonet.

In a further aspect, the disclosure relates to a hinge structure for connecting a first structure to a second in a pivotal manner, and the hinge structure may comprise a first assembly configured for mounting on a first structure and a second assembly configured for mounting on a second structure pivotally mounted on the first structure. The first assembly may include a central post with an outer surface, and the second assembly may include a sleeve receiving the central post and having an inward surface adjacent to the outer surface of the central post and an outward surface. A first port on the sleeve may define a first passage between the inward and outward surfaces. The hinge structure may further include a braking element configured to apply a selectable amount of resistance to pivoting of the first and second assemblies with respect to each other, and the braking element may be mounted on the sleeve to act on the central post. The braking element may comprise a first pressure element at least partially positioned in the first passage, with the first pressure element being mounted on the first port so as to be adjustably movable toward and away from the outer surface of the central post. The braking element may also include a friction pad positioned in the first passage between the first pressure element and the outer surface of the central post. Movement of the first pressure element in the first passage adjusts a degree of pressure applied to the friction pad by the first pressure element and by the friction pad to the outer surface of the central post to adjust a degree of pressure exerted on the outer surface of the central post by the friction pad to adjust a degree of resistance to pivoting of the sleeve and central post with respect to each other.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein:

FIG. 16 is a schematic side sectional view of an embodiment of the hinge structure incorporated into a tool and parts holder, according to an illustrative embodiment.

DETAILED DESCRIPTION

Figure 1:
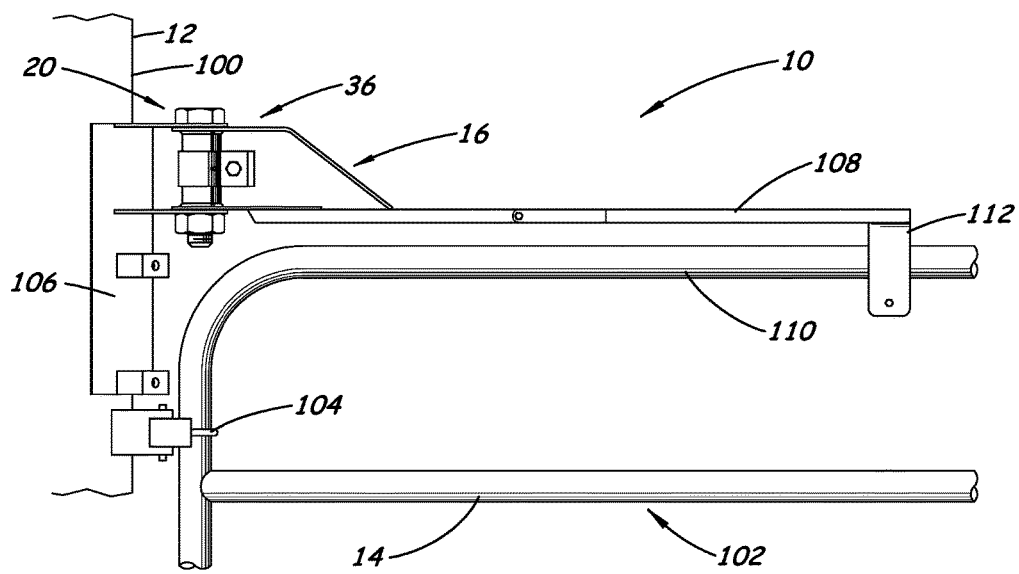
FIG. 1 is a schematic side view of an illustrative embodiment of a system including a new hinge structure according to the present disclosure.
Figure 2:
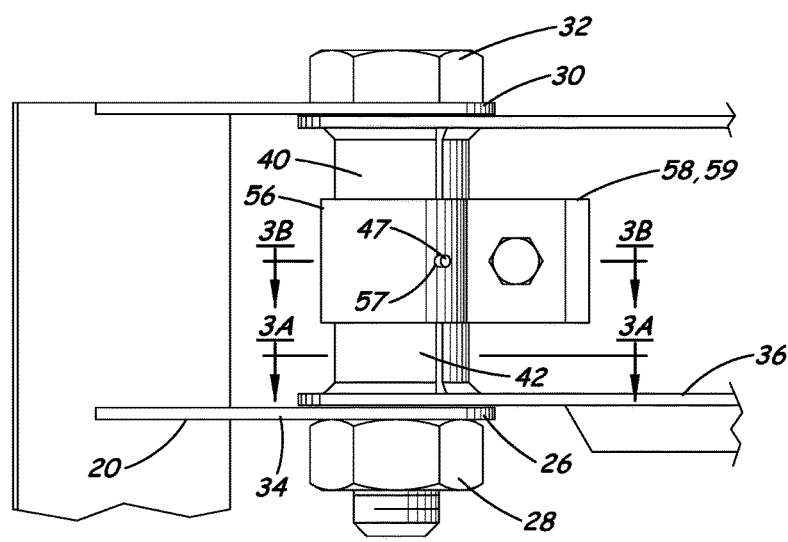
FIG. 2 is a schematic side view of the hinge structure, according to an illustrative embodiment.
Figure 3A:
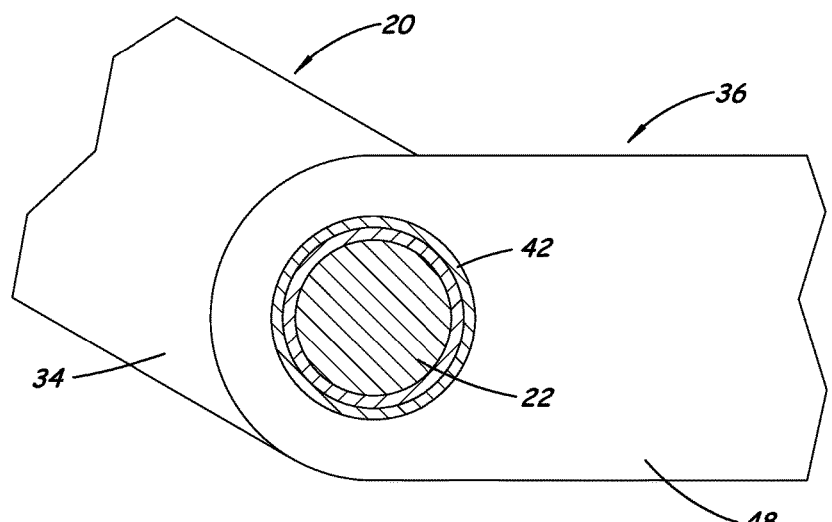
FIG. 3A is a schematic sectional view of the illustrative embodiment of the hinge structure shown in FIG. 2 taken along line 3A-3A.
Figure 3B:
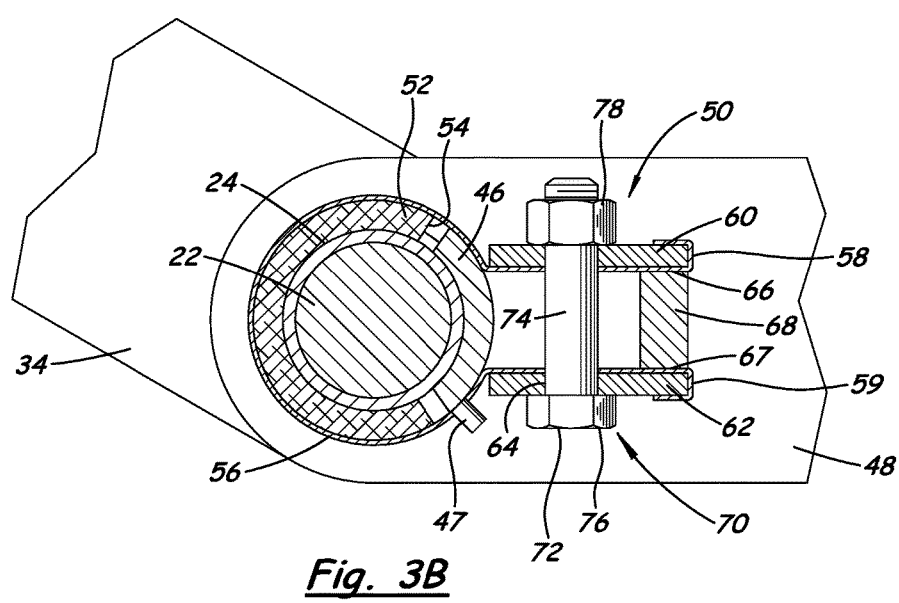
FIG. 3B is a schematic sectional view of the illustrative embodiment of the hinge structure shown in FIG. 2 taken along line 3B-3B.
Figure 4:
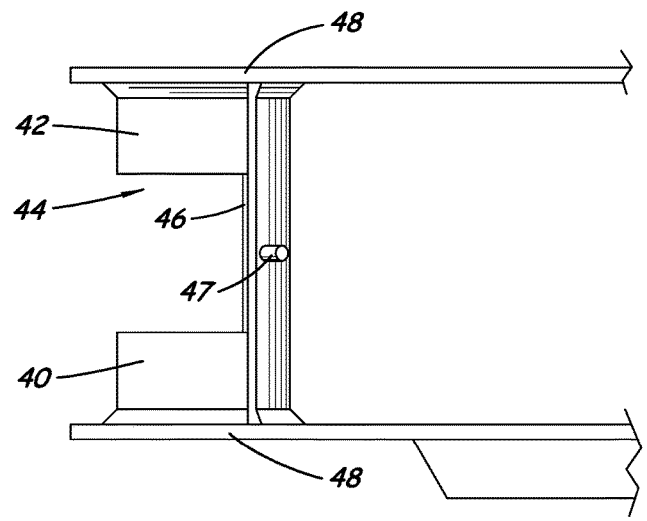
FIG. 4 is a schematic side view of a partially assembled hinge structure including elements of the second assembly of the hinge structure, according to an illustrative embodiment.
Figure 5:
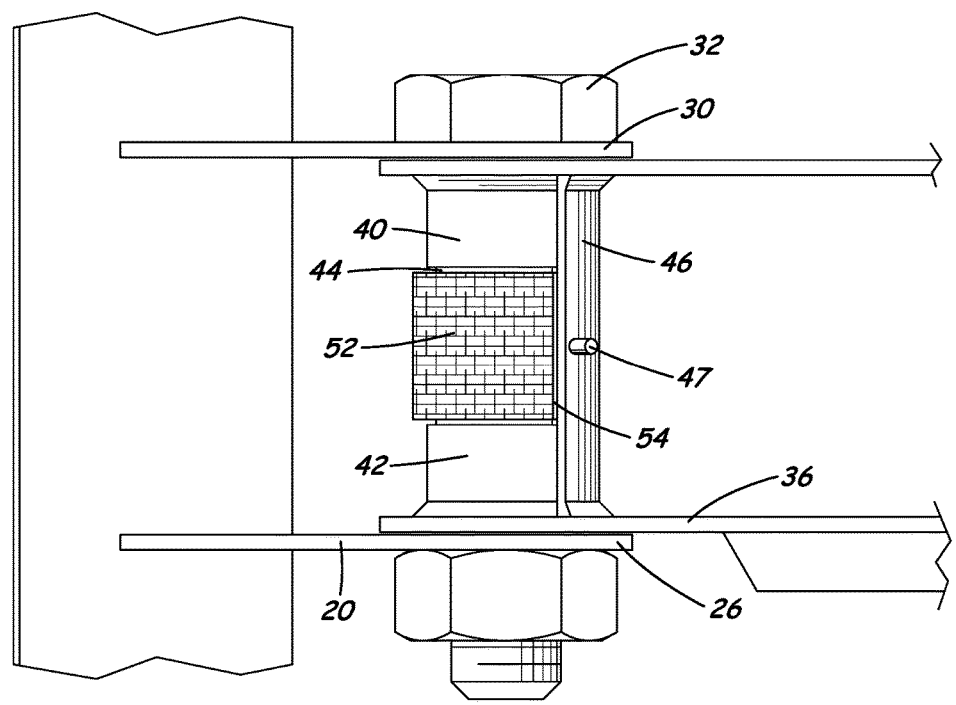
FIG. 5 is a schematic side view of a partially assembled hinge structure including elements of the first and second assemblies as well as the braking element the hinge structure, according to an illustrative embodiment.
Figure 6:
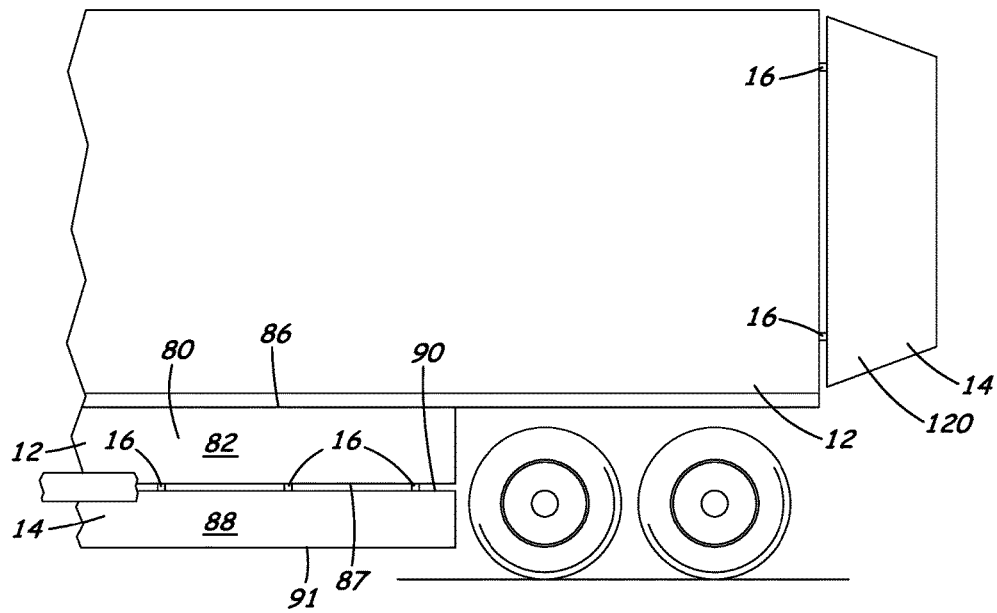
FIG. 6 is a schematic front side view of an aerodynamic panel system for a vehicle trailer utilizing the hinge structure, according to an illustrative embodiment.
Figure 7:
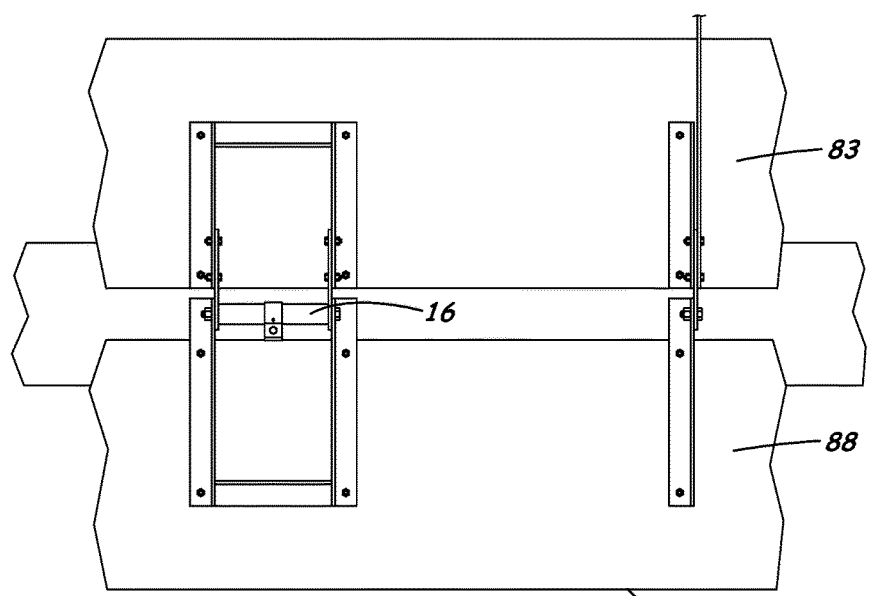
FIG. 7 is a schematic rear side view of the aerodynamic panel system for a vehicle trailer utilizing the hinge structure, according to an illustrative embodiment.
Figure 8:
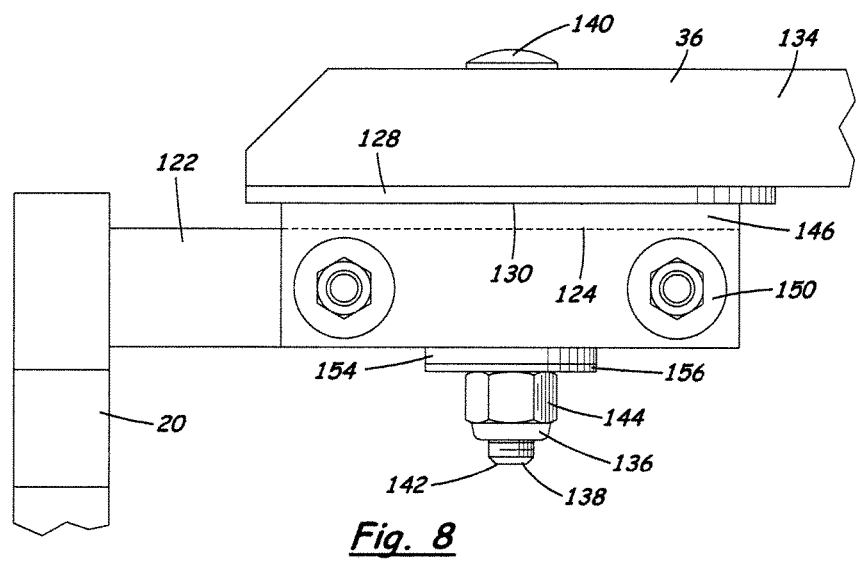
FIG. 8 is a schematic side view of another configuration of the hinge structure, according to an illustrative embodiment.
Figure 9:
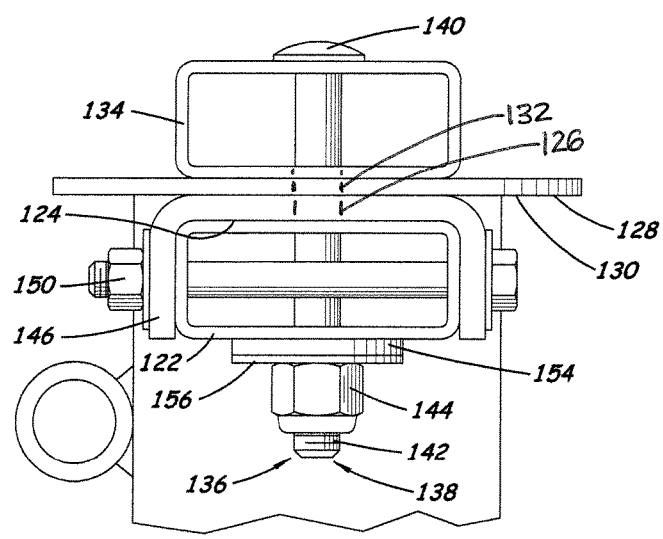
FIG. 9 is a schematic cross sectional view of the configuration of FIG. 8, according to an illustrative embodiment.
Figure 10:
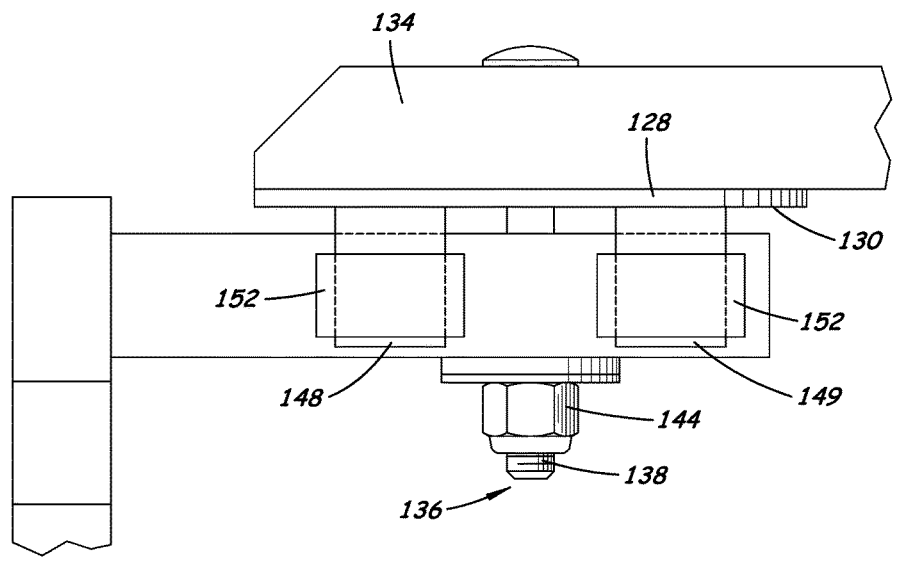
FIG. 10 is a schematic side view of a variation of the hinge structure of FIG. 8, according to an illustrative embodiment.
Figure 11:
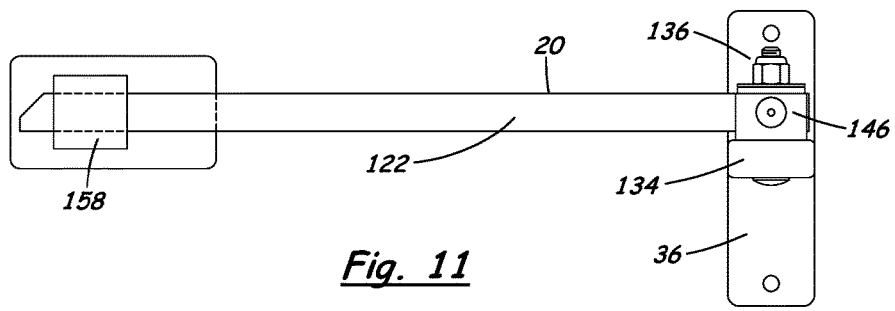
FIG. 11 is a schematic side view of another configuration of the hinge structure, according to an illustrative embodiment.

With reference now to the drawings, and in particular to FIGS. 1 through 16 thereof, a new hinge embodying the principles and concepts of the disclosed subject matter will be described.

In some aspects, the disclosure relates to a hinge structure 16 providing an adjustable degree of resistance to pivot movement between two structures, and in other aspects the disclosure relates to a system 10 that generally includes the hinge structure 16 as well as a first 12 and a second 14 structure with the hinge structure 16 connecting the first and second structures together to permit pivot movement of the structures 12, 14 with respect to each other. The hinge structure 16 may be adjustable to provide an adjustable degree of resistance to the relative pivot movement of the structures 12, 14 with respect to each other. In some embodiments, the hinge may be adjustable to provide substantially no resistance to the relative pivot movement to substantially complete resistance to the relative pivot movement. The adjustability of the degree of resistance to pivot movement may be virtually infinite in that there may not be discrete degrees or increments of resistance provided by the hinge structure 16, and rather the degree of resistance can be varied along a continuum.

The hinge structure 16 may include a first assembly 20 which is configured to be attached to or mounted on one of the structures 12, 14. In the illustrative embodiments shown in FIGS. 1 through 5, for example, the first assembly 20 may include a central post 22 with an outer surface 24 and with a bottom 28 and a top 32. In some embodiments, the central post 22 may be formed by a bolt and nut or nuts, or other fastener. The first assembly 20 may also include a bottom retainer member 26 mounted on the central post toward the bottom 28 and a top retainer member 30 mounted on the central post toward the top 32. The first assembly 20 may further include a first connector element 34 which is mounted on the central post, and the first connector element may be configured to mount on one of the structures 12, 14. The first connector element 34 may be configured to move as a unit with the post 22, such that connector element 34 rotates with the post.

The hinge structure 16 may also include a second assembly 36 which is configured to be attached to the other one of the structures 12, 14 which is not attached to the first assembly 20. The second assembly 36 may be pivotably coupled to the first assembly 20 such that the assemblies 20, 36 are able to move pivotally with respect to each other. The range of pivot movement of the second assembly with respect to the first assembly may be up to approximately 180 degrees or more. In the illustrative embodiments shown in FIGS. 1 through 5, the second assembly 36 may include at least one ring extending about the central post 22, and in some embodiments includes a pair of rings including a first ring 40 and a second ring 42 with each of the rings extending about the central post. The first and second rings may be spaced from each other along a longitudinal axis of the central post to thereby form a gap 44 between the first 40 and second 42 rings. A ring connector 46 may connect the first and second rings together with the connector 46 bridging between the first and second rings across the gap between the rings. The ring connector may be elongated in a direction substantially parallel to the longitudinal axis of the post 22, and may be curved in a lateral direction to fit more closed to the surface of the post. A positioning pin 47 may be mounted on the ring connector 46 and may extend radially outwardly from the surface of the ring connector. In some embodiments, the rings and ring connector are formed out of a single piece of material, although other separate pieces may be used to form the separate elements, and they may be connected together by some suitable method. The second assembly 36 may also include a second connector element 48 which is mounted on at least one of the rings. The second connector element 48 may be configured to mount on the particular structure 12, 14 to which the second assembly is mounted. In some embodiments, the second connector element 48 may have an end portion that forms an aperture for receiving a portion of the post, and the end portion may be joined to one of the rings 40, 42. The second connector element may be bifurcated into two end portions with each of the end portions being attached to one of the rings 40, 42.

A braking structure 50 may be configured to apply the selectable amount of resistance to relative pivot movement of the structures 12, 14 with respect to each other. The braking structure may be positioned or located between the first assembly 20 and the second assembly 36 of the hinge structure. The braking structure may include a friction pad 52 extending about a portion of the central post and may be generally in contact with the outer surface 24 of the post. In some embodiments, the friction pad 52 may be substantially cylindrical in shape with a slit 54 forming a space between ends of the pad to permit constriction of the friction pad about the outer surface 24 of the central post. In some embodiment, the size of the slit between the ends is sufficient to accommodate the ring connector with room to permit constriction of the pad about the post. The friction pad 52 may be positioned in the gap 44 between the first 40 and second 42 rings of the second assembly 36. The friction pad 52 may be formed of a material having a relatively high coefficient of friction, such as material used for brake linings. A suitable material may have a degree of flexibility to facilitate wrapping of the material about the post in a manner that keeps the material in contact with the surface of the post. One illustrative material is available as a brake lining material under the product no. M9010-1 from Raymark Friction Company, 123 E Stiegel St., Manheim, Pa., 17545-1626, although other materials from other sources may also be suitable for forming the friction pad.

The braking structure may further include a pressure band 36 which is configured to press the friction pad against the outer surface of the central post, and the pressure band may extend about the central shaft in a generally cylindrical configuration. The pressure band 56 may be elongated with opposite ends which are positioned proximate to each other but may not form a complete cylindrical structure. The opposite ends may include a first end 58 and a second end 59. The braking structure 50 may also include at least one cinch plate 60 being mounted on one of the ends of the pressure band 56. In some embodiments, each of the opposite ends 58, 59 of the pressure band 56 have a cinch plate mounted thereon, with a first cinch plate 60 being mounted on the first end 58 and a second cinch plate 62 being mounted on the second end 59 of the pressure band. At least one of the cinch plates may have an aperture 64 formed therein, and each of the plates may have an aperture formed therein. The first 60 and second 62 cinch plates may have respective opposing faces 66, 67 that are generally oriented substantially parallel to each other. The end portions of the pressure band 56 may be positioned between the opposing faces 66, 67, and an aperture may be formed in the band in alignment with the aperture (or apertures) 64 in the cinch plates. Optionally, a section of the end portion of the band may be wrapped about an outer edge of one or both of the cinch plates. A hole 57 may be formed in the pressure band 36 and the hole may be positioned on the band to receive the positioning pin 47 to resist movement of the band about the post to facilitate alignment of the ends 58, 59 and the cinch plates 60, 62 generally with the ring connector to maximize the contact of the band with the friction pad 52.

The braking structure 50 may also include a spacer 68 which is positioned between the cinch plates to facilitate orientation of the opposing faces 66, 67 of the cinch plates in a substantially parallel orientation with respect to each other and in some embodiments to provide a fulcrum function to facilitate tightening of the band about the friction pad 52 and the post 22. In some embodiments, the spacer is mounted on one of the cinch plates 60, 62 and may be positioned adjacent to the aperture 64. The spacer 68 may be positioned on the cinch plate on an opposite side of the aperture from the pressure band 56, such as at the outer edge of the cinch plate.

The braking structure may also include a connecting structure 70 for connecting the ends of the pressure band together and may be adjustable to move the opposite ends 58, 59 of the band towards each other and also being adjustable to permit the ends to move away from each other such that the pressure applied by the pressure band to the friction pad 52 may be adjusted. In some embodiments, the connecting structure 70 includes a fastener 72 connecting the cinch plates together such that tightening of the fastener moves the cinch plates together as well as the end portions of the pressure band. Loosening of the fastener 72 may permit the cinch plates and the end portions of the band to move apart from each other. In the illustrative embodiments, the fastener 72 includes a shaft 74, a head 76 that is formed on the shaft 74, with at least a portion of the shaft being threaded. The fastener 72 may also include a nut 78 which is threaded on the shaft. The shaft of the fastener may pass through the aperture 64 of at least one of the cinch plates, but optionally passes through the apertures in both cinch plates 60, 62 as well as any apertures in the end portions of the band. Optionally, the fastener may be fixedly mounted to one of the cinch plates in a more permanent fashion, and the shaft 74 may pass through an aperture in the other one of the cinch plates. Other suitable means may be used to move the plates together, such as a clamping structure acting on the plates or the end portions of the band.

Other aspects of the disclosure regard the nature of the first 12 and second 14 structures that are connected by the hinge structure 16. Suitable applications for the hinge structure are numerous, as situations where a hinge with an easily adjustable degree of pivot resistance is advantageous.

One illustrative application for the hinge is the mounting of a panel on a vehicle for enhancing the aerodynamic characteristics of the vehicle. For example, panels may be added to the underside or the backside of a semi-trailer for aerodynamic advantage. However, such panels need to extend down close to the road surface for the maximum beneficial effect, such that also makes the panel vulnerable to damage from debris or snow on the roadway, high spots in the curb cuts of driveways or any other high spots in the ground surface over which the vehicle is traveling.

One highly advantageous solution to such challenges is to have a bifurcated panel assembly in which an upper panel is relatively rigidly connected to the underside of the trailer, and a lower panel is mounted to move with respect to the upper panel. Such an approach is most beneficial if the lower panel is not easily moved by lower levels of force, such as by the air pressure exerted on the panel during highway travel, but can be moved by the application of higher levels of force, such as by impact of roadway debris or a high spot in the road surface with the lower panel that might be capable of damaging the lower panel. The adjustable degree of resistance to pivot movement of the hinge of the disclosure may permit the lower panel in such an application to move in response to higher levels of force but not lower levels.

Illustratively, the first structure 12 may comprise an upper panel 80, which may be a relatively thin panel in thickness and may have a first face 82 and a second face 83 located opposite of the first face. The panel 80 may be oriented substantially vertically such that the faces are substantially vertical, and the first panel may also be substantially rigidly held in position. The first panel 80 may have a first edge 86 and a second edge 87 located opposite of the first edge, with the first edge 86 being located relatively higher, and may be adjacent to the underside of the semi-trailer bed, and the second edge 87 may be relatively lower. In such embodiments, the second structure 14 may comprise a lower panel 88 with an upper edge 90 positioned adjacent to the second edge 87 of the upper panel 80. A gap may be formed between the lower edge 87 of the upper panel and the upper edge 90 of the lower panel to facilitate movement of the lower panel with respect to the upper panel, and the gap may be covered by a flap connected to one of the panels but free to move with respect to the other of the panels.

The hinge structure 16 may be attached to the upper panel 80, such as at or adjacent to the second edge 87, and the lower panel 88, such as at or adjacent to the lower edge 91. The hinge structure may be mounted on the panels as a part of a bifurcated mounting frame, with the bifurcated portions of the frame being mounted on the upper and lower panels and the hinge structure being located at a pivot between the frame portions. One, or a combination of more than one, of the hinge structures may be mounted at the pivot between the frame portions to provide a suitable degree of resistance to pivot when adjusted. The hinge structure 16 may thus control the movement of the lower panel 88 with respect to the upper panel 80, and provide an adjustable degree of resistance to movement of the lower panel with respect to the upper panel. In this way the resistance may be adjusted so that air pressure acting on the lower panel does not move the lower panel, but contact of the lower panel with debris or the ground surface is able to move the lower panel out of the way of the object to minimize or prevent damage. Optionally, when the lower panel needs to be moved out of the way, such as to perform servicing on components on the underside of the trailer bed, the hinge structure can be adjusted (loosened) to permit the lower panel to be pivoted upwardly and then adjusted again (tightened) to hold the lower panel in a raised position, such as, for example, in an orientation substantially parallel to the ground surface. The lower panel can then be returned to a substantially vertical orientation after servicing has been completed.

In other applications, the hinge structure 16 may be advantageously utilized on a door or a pass-through gate to provide a degree of resistance in any tendency of the door or gate to swing shut (or open) without some assistance through force applied to the door or gate by a user. The door may be a door mounted on a building structure or on a vehicle or trailer, for example. The gate may be a pass-through gate on an agricultural or a residential or commercial fence. In such an application, the first structure may comprise a gate post 100 and the second structure may comprise a gate panel 102 to provide an adjustable degree of resistance of the pivot movement of the gate panel with respect to the gate post to facilitate holding the gate panel in an open condition, while passage through the gate opening is performed. The gate may be connected to the post by one or more primary hinges, and the hinge structure 16 may be utilized in addition to the primary hinge or hinges. The hinge structure may be mounted on the gate post by a mounting plate 106, which may have an angle configuration or a U-shaped configuration that extends about a portion of the circumference of the post. Illustratively, one or more fasteners may pass through holes in the plate and extend into the post to hold the plate 106 to the post. A gate arm 108 may be mounted on the gate panel 102, and may extend along a portion of the gate panel and may be mounted on one of the bars 110 of the gate. The arm 108 may terminate with a loop 112 that loops about the gate bar and functions to move with the gate or resist movement of the gate depending upon the adjustment of the hinge structure. The arm 108 may be mounted or otherwise attached to one of the first 34 and second 48 connector elements, and the mounting plate 106 may be mounted or otherwise connected to the other one of the first and second connector elements.

In yet another application, the hinge structure may be beneficially used in a system of aerodynamic panels mounted on the rear end of a semi-trailer to reduce aerodynamic drag. A panel 120 may be mounted on each lateral side of the rear end of the enclosed box of a semi-trailer to assist in the transitional flow of air behind the trailer as the trailer passes through the air during high-speed highway travel. The usefulness of the panels 120 is limited to times of highway travel, and during other periods of travel and during loading and unloading of the trailer it is desirable to move the panels into a position that is close to the trailer, such as against the rear cargo doors of the trailer. The hinge structure 16 may be used, alone or in combination with conventional hinges, to mount the panel to the cargo door or side wall of the trailer and may be moved outwardly from the surface of the trailer when higher speed travel is anticipated, and then returned to a position adjacent to the trailer surface for slower travel or loading/unloading of cargo. The pivot resistance of the hinge structure may be adjusted and increased to hold the panel in the operative position or the storage position, and then the resistance may be decreased to permit movement between the operative and storage positions.

Other embodiments of the hinge structure are possible, such as those shown in FIGS. 8 through 11, which are useful for the applications discussed above as well as other applications, such as adjustable door holders or stops. In such embodiments, the first assembly 20 comprises a first connector element 122 that may be connected to one of the structures 12, 14, and may have a first compression surface 124 which may be generally planar in character. The first assembly 20 may also include a first pivot aperture 126 which may extend through the first compression surface 124, and may also extend through the first connector element 122. In some applications, the first compression surface 124 may be substantially horizontally oriented, and may be located on an upper surface (see e.g., FIG. 8) but may also be located on a lower surface (see e.g., FIG. 11). The first connector element 122 may comprise a bar for connecting to one of the structures 12, 14. In some embodiments a connector loop 158 may be mountable on one of the structures 12, 14, such as a door of an enclosure, to receive a portion of the connector element 122.

The second assembly 36 of the hinge structure may include a plate 128 having a second compression surface 130 which may be substantially planar in character and may be formed on a lower surface of the plate. The plate 128 may be substantially circular (although other suitable shapes could be used) and may being substantially horizontally oriented with the second compression surface also being substantially horizontally oriented. A second pivot aperture 132 may extend through the plate 128 and through the second compression surface 130. A second connector element 134 may be mounted on the plate 128, and in some embodiments the second connector element may be positioned adjacent to an upper surface of the plate. The second pivot aperture 132 may extend through the second connector element 134.

A connector fastener 136 may pass through the first pivot aperture 126 of the first assembly and the second pivot aperture 132 of the second assembly to pivotally connect the first connector element 122 to the plate 128 and the second connector element 134.

In some embodiments, the connector fastener 136 may be tightened to bring these elements toward each other and may also be loosened to allow these elements to move apart. The connector fastener 136 may comprise a bolt 138 with a head 140 and shaft 142 with a threaded portion, and a nut 144 may be threaded onto the threaded portion of the shaft 142. In some embodiments, a compressible washer 154 may be positioned about the shaft 142 for being pressed against the elements connected by the connector fastener 136 to bias the elements together, and a rigid washer 156 may also be employed to facilitate the application of pressure to the compressible washer.

In embodiments such as shown in FIGS. 8 through 11, the braking element may comprise a friction pad 146 may positioned between the first compression surface 124 and the second compression surface 130, and in some embodiments the friction pad is mounted on or otherwise attached to the first connector element 122 to move with the element 122. In some of the illustrative embodiments (see e.g., FIGS. 8 through 10), the friction pad 146 may include a pair of friction strips 148, 149, and the friction strips may be positioned on opposite sides of the shaft 142 of the connector fastener. In other illustrative embodiments (see e.g., FIG. 11), the connector fastener may pass through the friction pad 146. In some embodiments, the friction pad, or strips, may be mounted on the first connector element 122 by a fastener 150 which may pass through a portion of the friction pad or strips, and a portion of the first connector element 122. In other embodiments, the friction pad or strips may be mounted on the first connector element 122 by one or more loops 152, with the loop or loops being mounted on the first connector element and receiving a portion of the friction pad or strip extending through the loop or loops.

It will be appreciated that the tightening of the connector fastener 136 tends to move the first 124 and second 130 compression surfaces towards each other with the friction pad or strips being positioned therebetween and the tightening functions to compress the friction pad or strips to enhance the degree of friction between the friction pad and the second compression surface (as the friction pad moves with the first compression surface) and thus adds a degree of restriction to pivot movement of the assemblies 20, 36 with respect to each other. Conversely, loosening the connector fastener tends to decrease the compression of the friction pad and correspondingly decreases the degree of friction between the friction pad and the second compression surface and thus permits freer pivot movement of the assemblies 20, 36 with respect to each other.

Figure 12:
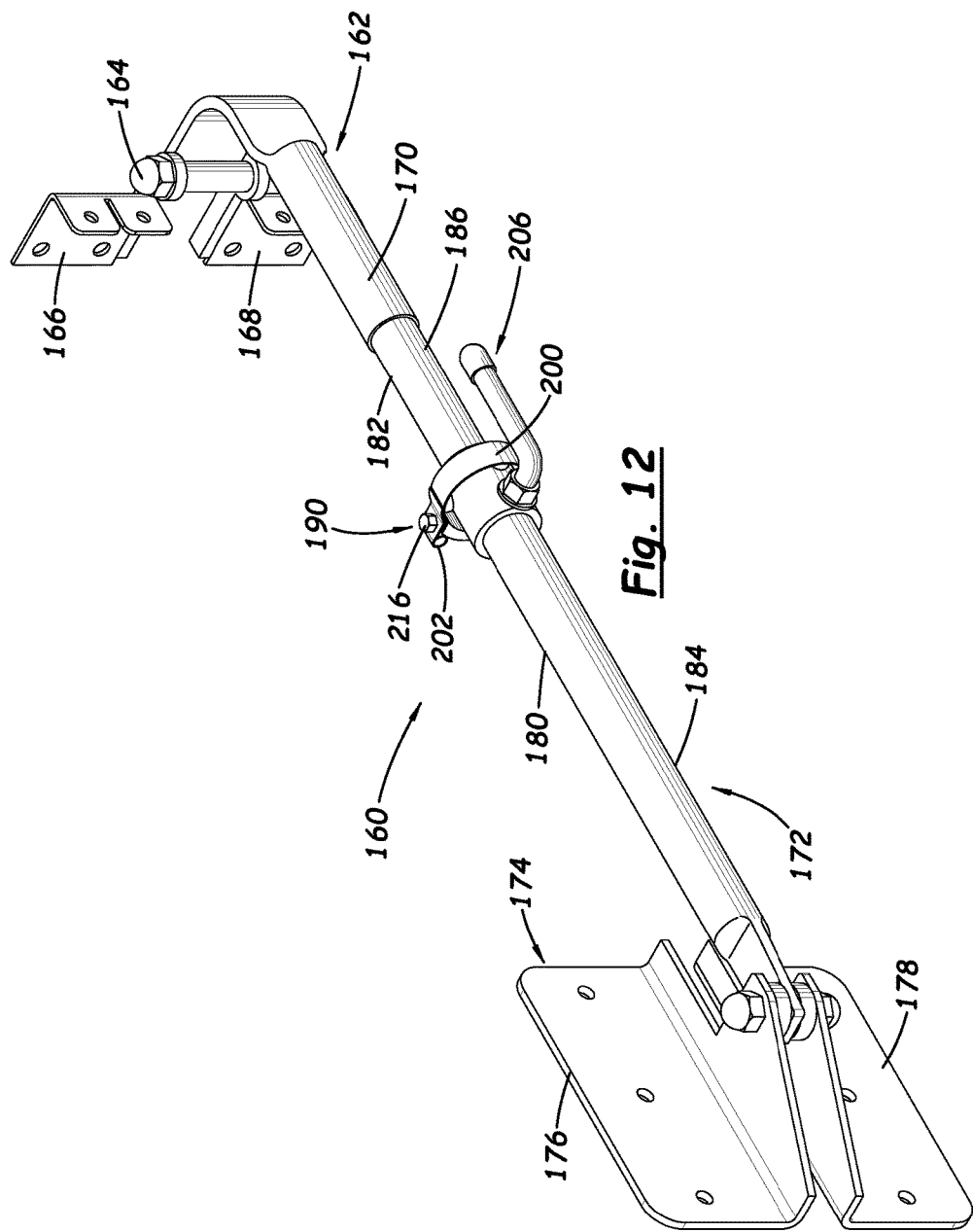
FIG. 12 is a schematic perspective view of another embodiment of the hinge structure, according to an illustrative embodiment.
Figure 13:
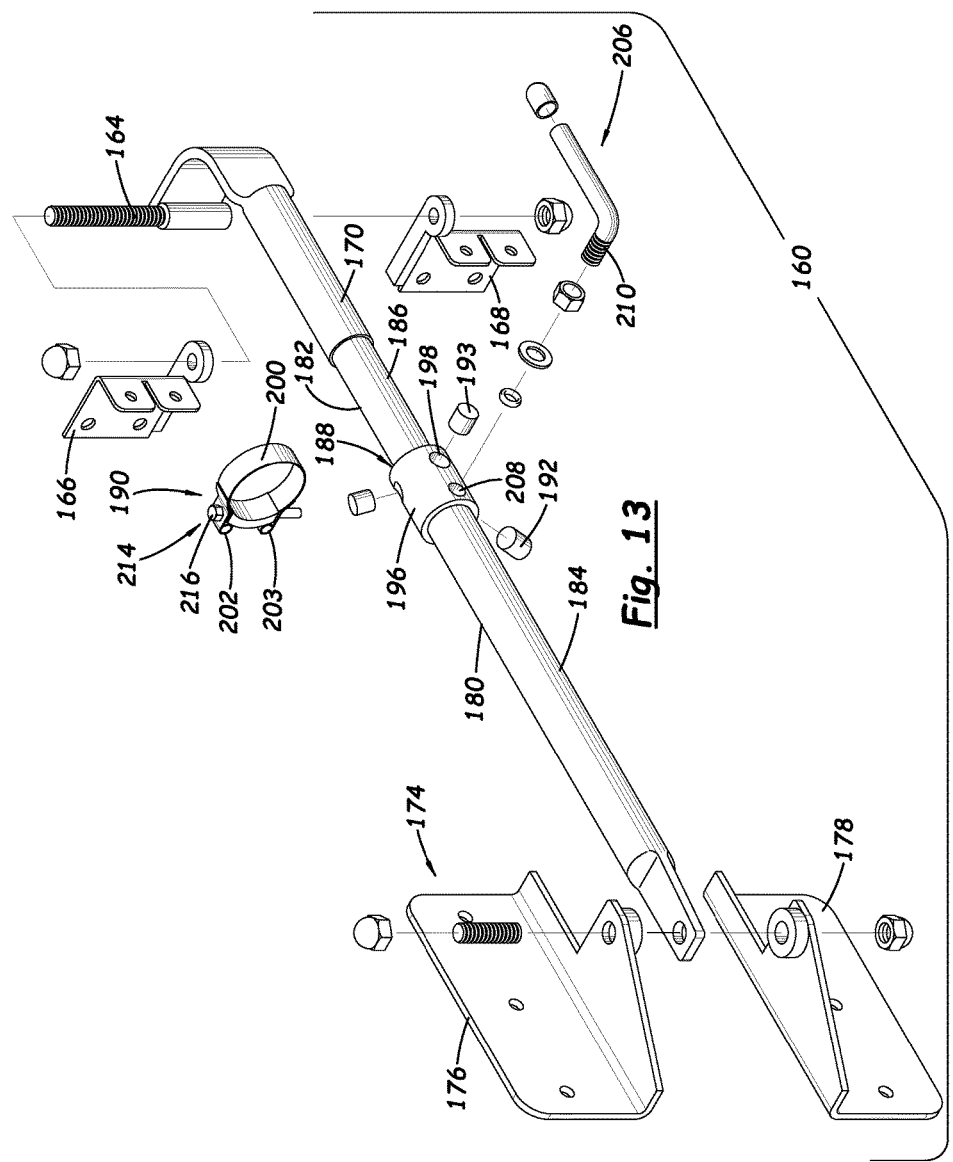
FIG. 13 is a schematic exploded perspective view of the embodiment of the hinge structure shown in FIG. 12, according to an illustrative embodiment.

In other aspects of the disclosure, such as the embodiment 160 shown in FIGS. 12 and 13, a first assembly 162 may be configured to be attached to one of the structures. The first assembly 162 may include a pivot post 164 which is pivotally mounted on one of the structures of the first and second structures. The pivot post 164 may be configured to rotate about an axis which may be substantially parallel to an axis about which the first and second structures pivot with respect to each other. In some embodiments, the pivot post may be a pin on which the structures are hingedly connected to each other such that the first assembly is not directly connected to one of the structures, but is indirectly connected to both through the hinge or pivot mount connecting the structures. The pivot post 164 may be mounted on at least one, and in some embodiments a pair of, post mounting tabs 166, 168. The first assembly 162 may also include a first arm 170 which may be mounted on the pivot post 164 and may extend from the pivot post, such as in a plane that is oriented substantially perpendicular to the first axis about which the pivot post rotates. The first arm 170 may form a sleeve that receives a portion of the post to thereby mount the arm 170 on the pivot post to rotate with the pivot post, although in other embodiments the first arm may rotate freely with respect to the pivot post.

The embodiment 160 may also include a second assembly 172 which is configured to be attached to the one of the first and second structures, and usually is connected to the structure that is not directly connected to the first assembly 162. The second assembly 172 may include a mount 174 which is configured to mount on the structure associated with the second assembly. The mount 174 may include at least one mounting tab 176 and may include a pair of the mounting tabs 176, 178 which may be fastened to the respective structure (such as, for example, the panel). The second assembly 172 may also include a second arm 180 which is mounted on the mount 174 in a manner that permits pivot movement of the second arm 180 with respect to the amount. The second arm may be elongated in shape, and may generally extend towards the pivot post and first arm of the first assembly 162.

One of the first 170 and second 180 arms may have a bayonet section 182 and the other arm of the first and second arms may include a sheath section 184. The bayonet section 182 may be extendable with respect to the sheath section 184, and in some embodiments the bayonet 182 and sheath 184 sections are telescopic with respect to each other, and may be telescopically mounted together. In some embodiments, the bayonet section 182 may be slidably inserted into the sheath section 184. The bayonet section 182 may have an outer surface 186, and the outer surface may be substantially cylindrical in shape although other shapes may be utilized. The sheath section 184 may define a cavity 188 which is complementarily shaped with respect to the outer surface 186, and the bayonet section may extend into the cavity and be slidably movable with respect to the sheath. In the illustrated embodiments of the disclosure, the first arm 170 includes the bayonet section 182, and the second arm 180 includes the sheath section 184, although it is possible that the configuration may be reversed.

The hinge structure of the embodiments 160 may include a braking element 190 which is configured to apply a selectable amount of resistance to pivot movement of one structure with respect to the other structure, such as the panel with respect to the base. More specifically, the braking element 190 may be configured to apply a selectable amount of resistance to the sliding movement of the bayonet section 182 with respect to the sheath section 184. The braking element 190 may include at least one friction pad 192 which is positioned adjacent to a portion of the outer surface 186 of the bayonet section in order to be able to contact and be pressed against the outer surface. In some embodiments, a plurality of friction pads 192, 193 are employed and may be positioned substantially equidistantly from each other about a perimeter of the outer surface of the bayonet section. The friction pads may be separate from each other and may be spaced from each other as well.

The braking element 190 may also include a guide band 196 which is configured to extend about the bayonet section 182, and the outer surface 186 of the bayonet section. The guide band may be mounted on the sheath section 184 to move as a unit with the sheath as the bayonet section moves with respect to the sheath section, and the guide band may be positioned at the end of the sheath section that opens into the cavity 188. The guide band 196 may have at least one guide aperture 198 which may extend through the band, and a friction pad may be positioned in each one of the guide apertures. The guide apertures 198 in the guide band may be positioned on the guide band to position and hold the plurality of friction pads in the desired relationship, such as in the substantially equidistant relationship about the perimeter of the outer surface of the bayonet section. The guide band 196 may be substantially continuous about the bayonet section in a continuous ring, although partial encirclement may also be employment.

The braking element 190 may also include a pressure band 200 which is configured to press the one or more friction pads against the outer surface 186 of the bayonet section to resist movement of the bayonet section to an adjustable degree of resistance. The pressure band 200 may extend about the outer surface of the bayonet section, and may extend about the guide band 196 such that the guide band is located between the pressure band and the outer surface of the bayonet section. The pressure band may be elongated with opposite ends, and may include a first end 202 and a second end 203.

The braking element 190 may also include a connecting structure 214 for connecting the ends of the pressure band in an adjustable manner to permit adjustment of the degree of friction applied by the friction pads to the outer surface and thereby adjust the degree of resistance of movement of the arms 170, 180 with respect to each other. The connecting structure 214 may move the ends 202, 203 of the pressure band 200 closer toward each other to increase the friction applied by the friction pads to the bayonet section, and may permit the ends of the pressure band to move apart to thereby release or reduce resistance by the friction pads to movement of the bayonet section with respect to the sheath section. The connecting structure to 14 may include a fastener 216 which connects the ends 202, 203 of the pressure band together, and tightening of the fastener 216 may move the ends toward each other to increase the resistance to sliding and loosening of the fastener may permit the ends to move apart from each other to decrease the resistance to sliding. Illustratively, of the fastener 216 may have a shaft, a head formed on the shaft, and a nut threaded on the shaft so that rotation of the nut with respect to the bolt tightens and loosens the pressure band. Other suitable fastening devices may also be used.

In some embodiments, the braking element 190 may also include a lock element 206 which is configured to selectively lock the position of the bayonet section and the sheath section with respect to each other, and may do so in a manner that is more rigid and unyielding than the braking assembly. The lock element 206 may be mounted on the sheath section, and may extend through a lock aperture 208 in the guide been 196 such that an end 210 of the lock element is able to press against the outer surface 186 of the bayonet section. The lock element may be elongated to act as a handle and provide additional leverage to the fingers of the user to tighten and loosen the lock function. In some embodiments, a portion of the lock element 206 may be threadedly mounted in the lock aperture 208 of the guide band 196 such that rotation of the lock element in a first rotational direction presses the end 210 against the outer surface of the bayonet section, and rotation of the lock element in a second rotational direction reduces any pressure exerted by the end 210 against the outer surface of the bayonet section to release or decrease resistance to sliding movement applied by the lock element of the bayonet section with respect to the sheath section.

Figure 14:
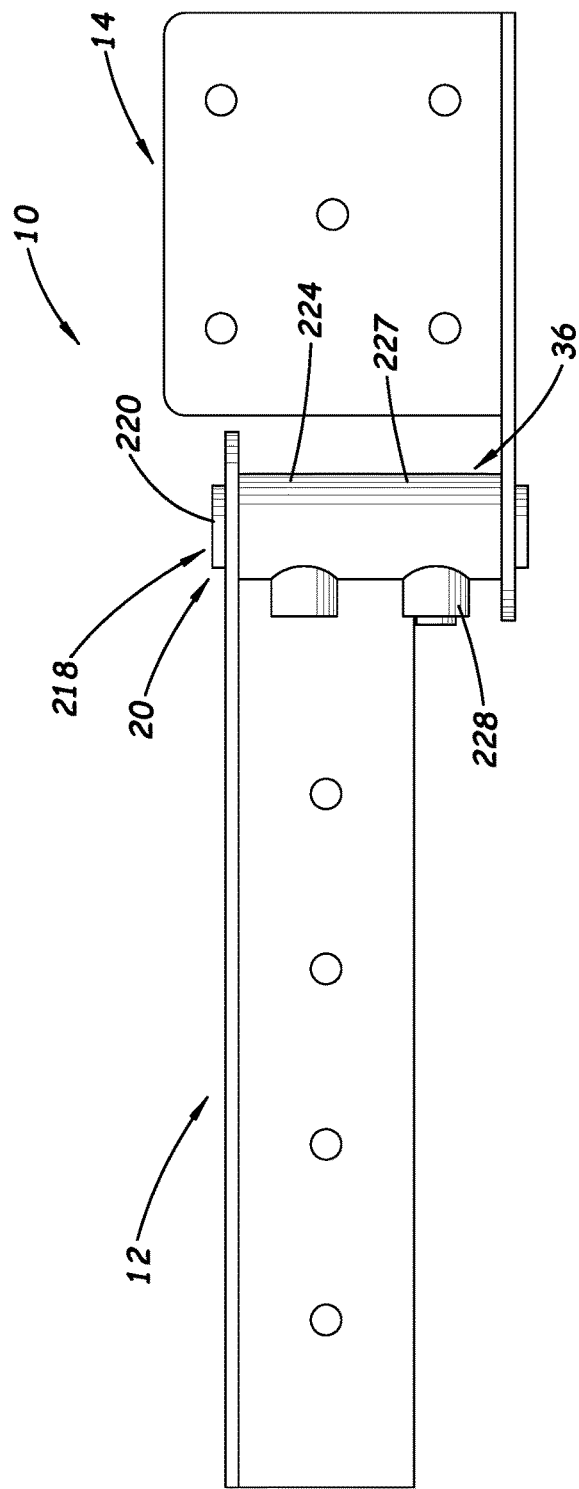
FIG. 14 is a schematic side view of another embodiment of the hinge structure, according to an illustrative embodiment.
Figure 15:
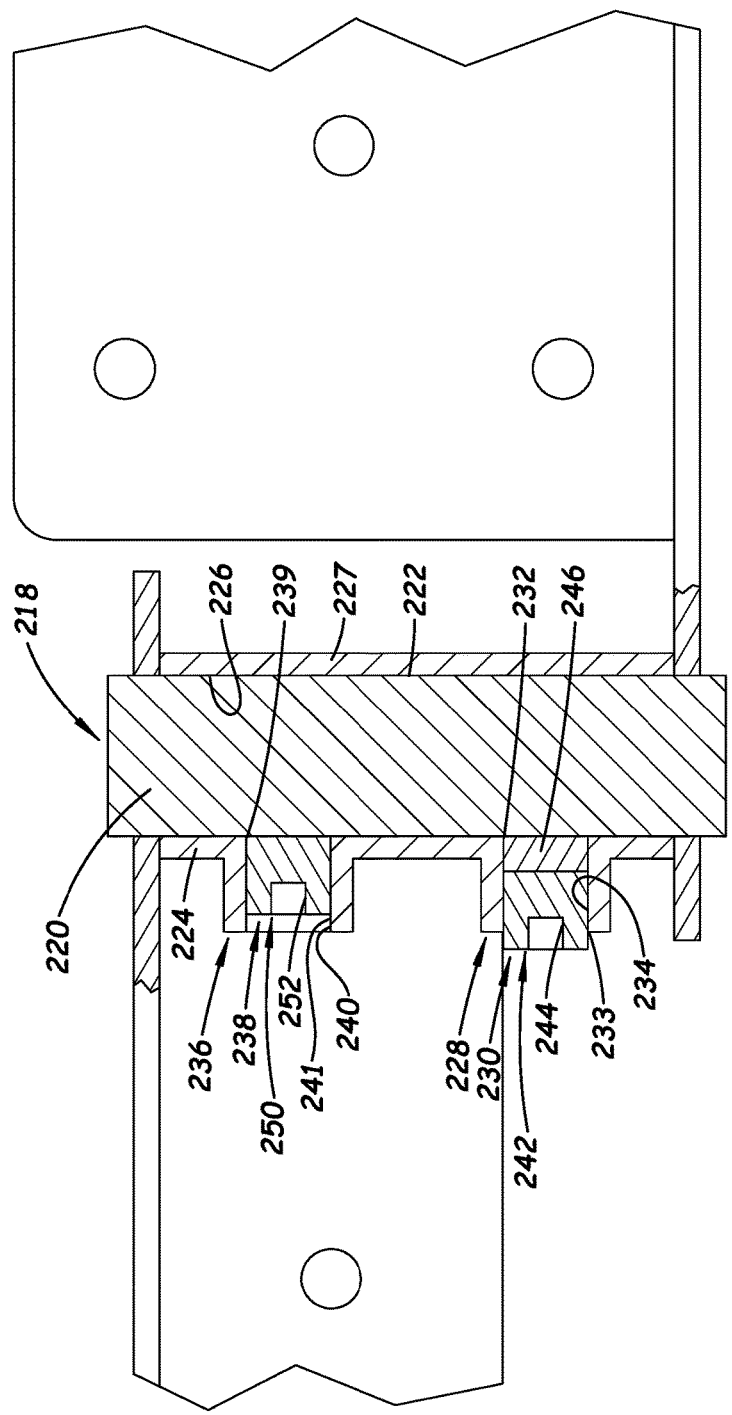
FIG. 15 is a schematic side view of the embodiment of FIG. 14 with a partial cross section of elements of the hinge structure, according to an illustrative embodiment.

In still other embodiments, such as shown in FIGS. 14 and 15, a hinge structure 218 includes a first assembly and a second assembly, with the first assembly being mounted on a first structure and the second assembly being mounted on a second structure. The first and second structures may be of any suitable type, such as are described in this disclosure. The first assembly may include a central post 220 having an outer surface 222 extending between opposite end portions of the central post. The outer surface 222 may be substantially cylindrical in shape and may be smooth and devoid of any significant grooving.

The second assembly may include a sleeve 224 which receives the central post 220 in a manner that permits the sleeve and the central post to rotate with respect to each other. The sleeve 224 may have an inward surface 226 positioned in opposition to the outer surface 222 of the central post, and an outward surface 227 positioned opposite of the inward surface 226 of the sleeve. The sleeve 224 may have opposite ends, and the opposite end portions of the central post may extend out of the opposite ends of the sleeve.

The second assembly may also include a first port 228 on the sleeve 224 which may extend between the inward 226 and outward 227 surfaces of the sleeve. The first port may define a first passage 230 between the inward and outward surfaces of the sleeve. The first port 228 may have a first inward opening 232 at the inward surface and a first outward opening 233 at the outward surface of the sleeve. A first passage surface 234 may extend between the first inward 232 and first outward 233 openings. The second assembly may further include a second port 236 on the sleeve 224. The second port 236 may extend between the inward and outward surfaces of the sleeve, and may define a second passage 238 between the inward and outward surfaces. The second port 236 may have a second inward opening 239 at the inward surface and a second outward opening 240 at the outward surface of the sleeve. A second passage surface 241 may extend between the second inward 239 and second outward 240 openings. At least a portion of the second passage surface 241 may be threaded.

In the hinge structure 218, a braking element may include a first pressure element 242 mounted on the sleeve 224. The first pressure element 242 may be mounted on the first port 228 of the sleeve, and the first pressure element may be at least partially positioned in the first passage 230 of the first port. The first pressure element 242 may comprise a first disc 244 which may have a perimeter threaded to engage threads formed on the first passage surface 234 of the first port so that rotation of the first disc in a first rotational direction advances the first disc towards the first inward opening and thus towards the outer surface 222 of the central post. Conversely, rotation of the first disc in a second rotational direction (opposite of the first rotational direction) advances the first disc toward the first outward opening and thus away from the outer surface of the central post. The first disc 244 may be provided with suitable structure for being engaged by a tool to cause the desired rotation, such as a screwdriver slot or hexagonal recess engagable by a hex head wrench.

The braking element may also include a friction pad 246 which is mounted on the first port 228. The friction pad 246 may be positioned in the first passage between the first pressure element 242 and the outer surface 222 of the central post. Rotation of the first disc 244 in the first rotational direction tends to apply, and then increase the application of, pressure on the friction pad 246, and corresponding pressure of the friction pad against the outer surface 222, to increase the braking effect on the rotation of the central post with respect to the sleeve. Conversely, rotation of the first disc in the second rotational direction tends to decrease pressure applied by the disc on the friction pad, and corresponding pressure of the friction pad against the outer surface 222, to decrease the braking effect on the rotation of the central post with respect to the sleeve. The braking element thus permits a high degree of adjustability in creating a degree of resistance to the pivoting of the central post and the sleeve relative to each other through the degree of pressure applied to the friction pad by the pressure element, and by the friction pad to the outer surface of the central post. While substantially complete resistance to pivoting of the central post and sleeve relative to each other may be achieved by the braking element, typically the braking element is most effective for creating a desirable degree of resistance to pivot movement between the central post and sleeve that is less than complete prevention of pivot movement, but is more than pivot movement that is completely free of resistance. For example, movement of gates and doors may be provided with some degree of resistance that does not prevent movement but resists free pivot movement.

The hinge structure 218 may also include a locking element which may include a second pressure element 250 which is mounted on the sleeve. The second pressure element may be mounted on the second port 236 of the sleeve, and may be at least partially positioned in the second passage 238 of the second port. The second pressure element 250 may comprise a second disc 252 which may be provided with suitable structure for being engaged by a tool to cause the desired rotation, such as a screwdriver slot or hexagonal recess engagable by a hex head wrench. The second disc 252 has a perimeter which may be threaded to engage threads formed on the second passage surface 241 of the second port 236 so that rotation of the second disc 252 and a first rotational direction advances the second this toward the second inward opening and toward the outer surface 222 of the central post. Conversely, rotation of the second disc 252 in a second rotational direction opposite of the first rotational direction advances the second disc toward the second outward opening and away from the outer surface of the central post. In contrast to the braking element, the second pressure element may bear directly upon and contact the outer surface of the central post to more quickly and effectively create a locked condition between the central post and the sleeve in which pivoting of the central shaft relative to the sleeve is prevented through direct pressure applied by the second pressure element to the outer surface of the central post. The locked condition is also more quickly and effectively released to an unlocked condition in which the locking element does not resist the relative pivot movement.

A further application of the hinge structure of the disclosure, and in particular a configuration of the hinge structure 218, is the tool and parts holder 260 shown in FIG. 16 of the drawings. The tool and parts holder 260 is highly useful for temporarily holding and retaining parts and tools during various activities, such as performing repair work on a vehicle. The holder 260 includes a pair of arms 262, 264 which are mounted together by a hinge structure 266 to thereby permit pivoting of the arms with respect to each other. The arms 262, 264 may be pivoted between a closed condition in which the arms are adjacent and substantially parallel to each other, and an open condition in which the arms are moved apart from each other. At least one of the arms 262, 264 includes a mounting structure 268 which may include a magnet 270 which permits the holder 260 to be removably mounted on a metallic or magnetically receptive surface, such as commonly found on a vehicle. At least one, and optionally both, of the arms has magnetic elements 263, 265 located on an inner side of the arm to permit metallic or magnetically receptive objects, such as tools or parts, to be removably magnetically mounted on the arms at the inner sides. Each of the arms may also have a grip 272 to facilitate finger movement of the arms with respect to each other.

Significantly, the hinge structure 266 includes or incorporates a braking element 274 which provides a selectable or adjustable amount of resistance to pivoting of one arm with respect to each other between the closed and open conditions. The hinge structure 266 may include any of the braking structures in the disclosure, and one highly suitable braking structure is of the type shown in FIG. 15 in which a friction pad 276 is urged against a central post 280 by a disc 278 rotatably mounted on a port formed on a sleeve 282 containing a portion of the central post. Optionally, the friction pad 275 might be omitted to provide a locking of the position of one arm with respect to the other arm.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A connecting structure for connecting a first structure to a second in a pivotal manner, the structure comprising:
a first assembly configured for mounting on a first structure and a second assembly configured for mounting on a second structure, the first assembly being pivotally mounted on the second assembly, the first assembly including a central post with an outer surface, the second assembly including a sleeve receiving the central post and having an inward surface adjacent to the outer surface of the central post and an outward surface, a first port on the sleeve defining a first passage between the inward and outward surfaces, a second port on the sleeve defining a second passage between the inward and outward surfaces of the sleeve; and
a braking element configured to apply a selectable amount of resistance to pivoting of the first and second assemblies with respect to each other, the braking element being mounted on the sleeve to act on the central post, the braking element comprising:
a first pressure element at least partially positioned in the first passage, the first pressure element being mounted on the first port so as to be adjustably movable toward and away from the outer surface of the central post;
a friction pad positioned in the first passage between the first pressure element and the outer surface of the central post;
wherein movement of the first pressure element in the first passage adjusts a degree of pressure applied to the friction pad by the first pressure element and by the friction pad to the outer surface of the central post to adjust a degree of pressure exerted on the outer surface of the central post by the friction pad to adjust a degree of resistance to pivoting of the sleeve and central post with respect to each other; and
a locking element configured to lock the first and second assemblies against pivoting with respect to each other in an infinite number of positions relative to each other, the locking element being mounted on the sleeve to act on the central post, the locking element comprising:
a second pressure element at least partially positioned in the second passage, the second pressure element being mounted on the second port so as to be adjustably movable toward and away from the outer surface of the central post to bring the second pressure element into and out of direct contact with the central post;
wherein movement of the second pressure element in the second passage adjusts a degree of pressure applied by the second pressure element directly to the outer surface of the central post.

2. The structure of claim 1 wherein the first port has a first passage surface defining the first passage, the first passage surface having threads; and
wherein the first pressure element has a perimeter with threads engaging the threads on the first passage surface such that rotation of the first pressure element in a first rotational direction advances the first pressure element toward the central post to increase pressure on the friction pad pressing against the outer surface of the central post and thereby increase the degree of resistance to pivoting of the sleeve and central post with respect to each other, and rotation of the first pressure element in a second rotational direction moves the first pressure element away from central post to decrease pressure on the friction pad pressing against the outer surface of the central post and thereby decrease the degree of resistance to pivoting of the sleeve and central post with respect to each other.

3. The structure of claim 1 wherein the second port has a second passage surface defining the second passage, the second passage surface having threads; and wherein the second pressure element has a perimeter with threads engaging the threads on the second passage surface such that rotation of the second pressure element in a first rotational direction advances the second pressure element toward the central post to increase pressure on the outer surface of the central post by the second pressure element to lock the central post and the sleeve against rotation relative to each other, and rotation of the second pressure element in a second rotational direction moves the second pressure element away from central post to decrease direct pressure on the outer surface of the central post and thereby unlock the sleeve and central post to pivot with respect to each other.

4. The structure of claim 1 wherein the first port has a first passage surface defining the first passage, the first passage surface having threads;

wherein the first pressure element has a perimeter with threads engaging the threads on the first passage surface such that rotation of the first pressure element in a first rotational direction advances the first pressure element toward the central post to increase pressure on the friction pad pressing against the outer surface of the central post and thereby increase the degree of resistance to pivoting of the sleeve and central post with respect to each other, and rotation of the first pressure element in a second rotational direction moves the first pressure element away from central post to decrease pressure on the friction pad pressing against the outer surface of the central post and thereby decrease the degree of resistance to pivoting of the sleeve and central post with respect to each other; and wherein the second pressure element has a perimeter with threads engaging the threads on the second passage surface such that rotation of the second pressure element in a first rotational direction advances the second pressure element toward the central post to increase pressure on the outer surface of the central post by the second pressure element to lock the central post and the sleeve against rotation relative to each other, and rotation of the second pressure element in a second rotational direction moves the second pressure element away from central post to decrease direct pressure on the outer surface of the central post and thereby unlock the sleeve and central post to pivot with respect to each other.

5. A connecting structure for connecting a first structure to a second in a pivotal manner, the structure comprising:

a first assembly configured for mounting on a first structure and a second assembly configured for mounting on a second structure, the first assembly being slidably mounted on the second assembly, the first assembly including a bayonet with an outer surface, the second assembly including a sheathe receiving the bayonet and having an inward surface adjacent to the outer surface of the central post and an outward surface, a first port on the sheathe defining a first passage between the inward and outward surfaces of the sheathe, a second port on the sheathe defining a second passage between the inward and outward surfaces of the sheathe; and a braking element configured to apply a selectable amount of resistance to pivoting of the first and second assemblies with respect to each other, the braking element being mounted on the sheathe to act on the bayonet, the braking element comprising:

a first pressure element at least partially positioned in the first passage, the first pressure element being mounted on the first port so as to be adjustably movable toward and away from the outer surface of the bayonet;

a friction pad positioned in the first passage between the first pressure element and the outer surface of the bayonet;

wherein movement of the first pressure element in the first passage adjusts a degree of pressure applied to the friction pad by the first pressure element and by the friction pad to the outer surface of the bayonet to adjust a degree of pressure exerted on the outer surface of the bayonet by the friction pad to adjust a degree of resistance to sliding of the sheathe and bayonet with respect to each other; and a locking element configured to lock the first and second assemblies against sliding with respect to each other in an infinite number of positions relative to each other, the locking element being mounted on the sheathe to act on the bayonet, the locking element comprising:

a second pressure element at least partially positioned in the second passage, the second pressure element being mounted on the second port so as to be adjustably movable toward and away from the outer surface of the bayonet to bring the second pressure element into and out of direct contact with the outer surface of the bayonet;

wherein movement of the second pressure element in the second passage adjusts a degree of pressure applied by the second pressure element directly to the outer surface of the bayonet.

6. The structure of claim 5 wherein the first port has a first passage surface defining the first passage, the first passage surface having threads; and wherein the first pressure element has a perimeter with threads engaging the threads on the first passage surface such that rotation of the first pressure element in a first rotational direction advances the first pressure element toward the bayonet to increase pressure on the friction pad pressing against the outer surface of the bayonet and thereby increase the degree of resistance to sliding of the sheathe and bayonet with respect to each other, and rotation of the first pressure element in a second rotational direction moves the first pressure element away from bayonet to decrease pressure on the friction pad pressing against the outer surface of the bayonet and thereby decrease the degree of resistance to sliding of the sheathe and bayonet with respect to each other.

7. The structure of claim 5 wherein the second port has a second passage surface defining the second passage, the second passage surface having threads; and wherein the second pressure element has a perimeter with threads engaging the threads on the second passage surface such that rotation of the second pressure element in a first rotational direction advances the second pressure element toward the bayonet to increase direct pressure on the outer surface of the bayonet by the second pressure element to lock the sheathe and bayonet against sliding relative to each other.

8. The structure of claim 5 wherein the first port has a first passage surface defining the first passage, the first passage surface having threads;
- wherein the first pressure element has a perimeter with threads engaging the threads on the first passage surface such that rotation of the first pressure element in a first rotational direction advances the first pressure element toward the bayonet to increase pressure on the friction pad pressing against the outer surface of the bayonet and thereby increase the degree of resistance to sliding of the sheathe and bayonet with respect to each other, and rotation of the first pressure element in a second rotational direction moves the first pressure element away from central post to decrease pressure on the friction pad pressing against the outer surface of the bayonet and thereby decrease the degree of resistance to sliding of the sheathe and bayonet with respect to each other;
- wherein the second pressure element has a perimeter with threads engaging the threads on the second passage surface such that rotation of the second pressure element in a first rotational direction advances the second pressure element toward the bayonet to increase direct pressure on the outer surface of the bayonet by the second pressure element to lock the sheathe and bayonet against sliding relative to each other, and rotation of the second pressure element in a second rotational direction moves the second pressure element away from bayonet to decrease direct pressure on the outer surface of the bayonet and thereby unlock the sheathe and bayonet to slide with respect to each other.

* * * * *